United States Patent [19]

Whisler

[11] Patent Number: 5,379,389
[45] Date of Patent: Jan. 3, 1995

[54] METHOD FOR TRANSMITTING COMMANDS EXCLUDED FROM A PREDEFINED COMMAND SET

[75] Inventor: John W. Whisler, Raleigh, N.C.

[73] Assignee: Alphatronix Inc., Research Triangle Park, N.C.

[21] Appl. No.: 183,257

[22] Filed: Jan. 19, 1994

Related U.S. Application Data

[63] Continuation of Ser. No. 816,542, Dec. 30, 1991, abandoned, which is a continuation of Ser. No. 361,306, Jun. 5, 1989, abandoned.

[51] Int. Cl.⁶ .................. G06F 3/06; G06F 13/10; G06F 13/12
[52] U.S. Cl. .................. 395/375; 364/260.1; 364/284.3; 364/DIG. 1
[58] Field of Search .................. 395/375, 650; 364/260.1, 284.3

[56] References Cited

U.S. PATENT DOCUMENTS

| | | | |
|---|---|---|---|
| 4,095,277 | 6/1978 | Bluethman et al. | 395/375 |
| 4,651,278 | 3/1987 | Herzog et al. | 364/900 X |
| 4,942,552 | 7/1990 | Merrill et al. | 364/900 |
| 4,942,579 | 7/1990 | Goodlander et al. | 371/51 |
| 5,073,854 | 12/1991 | Martin et al. | 364/425 |

FOREIGN PATENT DOCUMENTS 2220509  10/1990  United Kingdom .......... G06F 13/12

OTHER PUBLICATIONS

American National Standard X3.131-1986 (SCSI), pp. 86, 98 and 99.
CQD-220 SCSI host adapter, datasheet and programming manual, pp. 1-8, 37 and 38, 1987.
European Search Report for Application No. EP 90 30 4918.
IBM Technical Disclosure Bulletin, vol. 26, No. 11, Apr. 1984, "Transparent Mode In An I/O Controller" by B. L. Beukema, R. C. Booth and E. C. Grazier, pp. 5956-5959.
Abstract of Japanese Application No. 63-29862.

Primary Examiner—Gareth D. Shaw
Assistant Examiner—Dennis M. Butler
Attorney, Agent, or Firm—Staas & Halsey

[57] ABSTRACT

A method for transmitting commands from an originating program to a receiving program uses the data area of instructions. A first set of commands are predefined for use in the command area of the instructions. A second set of commands, excluded from the first set of commands, can pass through operating system modules, including driver software, by inserting them in the data area of an instruction. The second set of commands are identified by including identification codes in the data area, such as a predefined random number key. In addition, the command area can be used to eliminate the majority of normal commands quickly by always using a specific address and command in the first set of commands to transmit the second set of commands.

20 Claims, 3 Drawing Sheets

METHOD FOR TRANSMITTING COMMANDS EXCLUDED FROM A PREDEFINED COMMAND SET

This application is a continuation of application Ser. No. 07/816,542 filed Dec. 30, 1991, now abandoned, which is a continuation of application Ser. No. 07/361,306 filed Jun. 6, 1989, now abandoned.

BACKGROUND OF THE INVENTION

1. Field of the Invention

The present invention is related to transmitting commands from a central processor to a peripheral unit and, more particularly, to transmitting commands excluded from predefined commands for the peripheral unit known to the operating system controlling operation of the central processor.

2. Description of the Related Art

As illustrated in FIG. 1, a typical computer system of any size includes a central processor 10 which executes, in broad terms, two types of software. The type of software which computer users are most familiar with is generally termed application software 12. Examples of application software are word processors, accounting programs, database managers, communication programs, etc. Execution of application software requires an operating system 14. There any many modules included within an operating system. One module, driver software 16, is of primary interest although there are other operating system modules 18 which are also included in the operating system 14.

Most computer systems also include peripheral equipment 20 which is connected to the processor 10 by interface electronics 22. The number of components included in the interface electronics varies depending upon the complexity of the computer system. Examples of peripheral equipment 20 are disk drives, tape drives, modems, etc. The driver software 16 in the operating system 14 is required for most application software 12 to communicate with peripheral equipment 20.

Most computer systems are manufactured by companies which permit other companies to produce peripheral equipment for use with their computer systems. In some cases, the peripheral unit manufacturer provides the driver software 16, while in other cases, all modules of the operating system 14 are provided by the same vendor, typically the manufacturer of the computer system which includes the processor 10. In the latter case, the peripheral equipment manufacturer is limited to using the commands which can be communicated through the operating system 14. Even in the former case, the other operating system modules 18 between the application software 12 and driver software 16 may limit the types of commands which can be transmitted by the application software 12 to the driver software 16. As a result, the functions performed by the peripheral equipment 20 can be limited by a lack of foresight on the part of the designer of the operating system 14.

SUMMARY OF THE INVENTION

An object of the present invention is to provide for transmission of commands from application software through operating software incapable of handling such commands, to peripheral equipment.

Another object of the invention is to provide for transmission of such commands with a probability of falsely identifying such commands that is approximately equal to the probability of a data error in the peripheral equipment.

Yet another object of the present invention is to provide for accurate identification of such commands without significantly slowing the average execution time of the commands.

The above objects are attained by providing a method of processing instructions, each having a command area and a data area, the instructions including first and second sets of commands, the first sets of commands identified by codes in the command area, the method comprising the steps of identifying one of the second set of commands in dependence upon codes in the data area of one of the instructions and executing the one of the second set of commands identified. In one embodiment of the invention, the second set of commands are identified by detecting a predetermined series of codes in the data area indicating that one of the second set of commands is included in the data area of the instruction. Preferably, detection of the second series of codes is performed only if a predetermined command and a predetermined address are detected in the command area of the instruction.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

The situation described above regarding lack of flexibility in predefined instruction sets becomes a problem as newer, more sophisticated peripheral units become available for use with older computer systems. For example, opto/magnetic disk drives have recently become commercially available for many computer systems, but not directly from any of the major computer system manufacturers. As a result, some of the commands which are desired to be transmitted to such new peripheral equipment 20 are not provided for in existing driver software 16.

Figure 2:
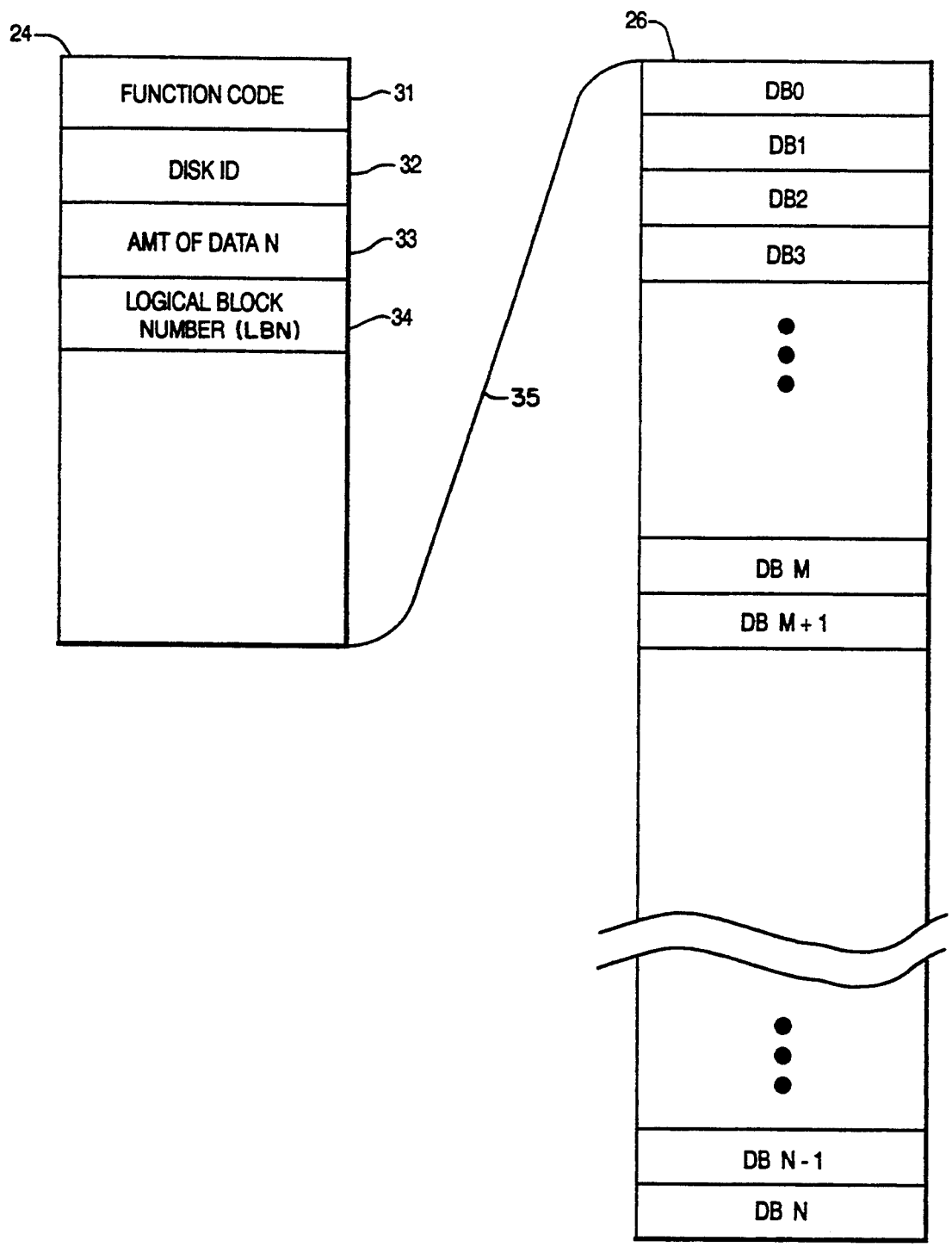
FIG. 2 is a record layout of an instruction.

A typical instruction record layout for a disk drive is illustrated in FIG. 2. Generally, instructions can be broken down into a command area 24 and a data area 26 which are transmitted in one or more blocks, where each block is a substantially continuous stream of codes and any pauses in the stream are not significant. This differs from modem communications where pauses are significant. The command area 24 will typically include fields such as function code 31, disk ID 32, amount of data (N) 33 and address 34. The address 34 may be a logical block number (LBN). The command area 24 is logically related to the data area 26 as indicated by line 35. However, the present invention is not limited to command and data areas 24, 26 which are contiguous or sequential, but can be applied to any known instruction format.

Generally speaking, the number of commands which may be included in a predefined set of commands is limited by the size of the function code field 31. Since the driver software 16 formats the instruction, even if the function code field 31 is very large, the number of commands in the predefined set may be extremely limited due to the failure of the driver software 16 to recognize commands excluded from the predefined set. Even in computer systems in which the driver software 16 may be provided by the manufacturer of the peripheral equipment 20, the other operating system modules 18 may restrict the types of commands which are passed to the driver software 16.

Therefore, according to the present invention, a second set of commands, excluded from the predefined first set of commands, are transmitted from application software 12 to the peripheral equipment 20 in the data area 26. One of the keys to transmitting a command in this manner is to provide for proper identification of the existence of a command in the data area 26, thus signifying that the command in the command area 24 should be ignored. There are two major criteria for selecting an appropriate method of identification. The first is to minimize the probability of falsely identifying existence of a command in the data area 26. Preferably, the probability of a false positive identification should be approximately equal to the probability of a data error in the peripheral equipment 20. Typical disk units have a data error probability of one in $10^{12}$ and thus the scheme used for identifying existence of a command in the data area 26 should have a probability of false positive identification that is less than one in $10^{10}$.

The second major criteria for selecting the scheme used for identifying commands in the data area 26 is that the average time spent to perform the identification process should not add appreciably to the execution time of commands transmitted in the command area 24. Obviously, these criteria cannot automatically be satisfied simultaneously. As more time is spent identifying a command, the likelihood of a false positive identification is decreased.

Figure 3:
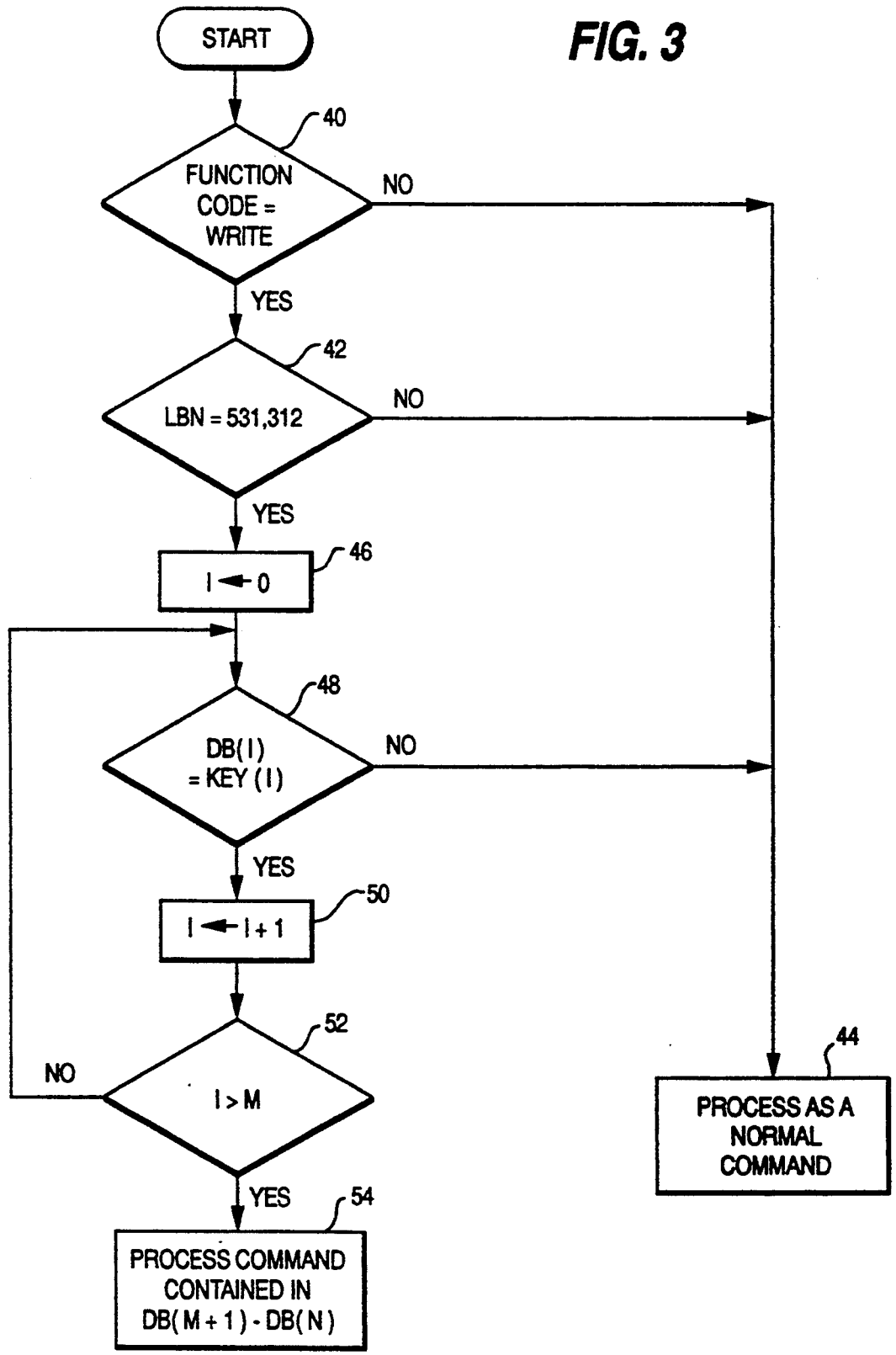
FIG. 3 is a flowchart of a method according to the present invention.

One method of meeting both criteria is to use the contents of the command area 24 to partially identify the existence of a command in the data area 26. An example is illustrated in the flowchart of FIG. 3. First, the function code field is checked 40 to determine whether a specific command in the first (predetermined) set of commands, such as a write command, is present. If so, the address (LBN) is checked 42 to determine whether a specific logical block number is being addressed. Where the peripheral equipment 20 is a disk drive, such as an opto/magnetic disk drive which can access a large amount of memory, e.g., approximately 600 megabytes, these two steps alone will eliminate almost all commands in the first command set very quickly. As a result, the commands will be processed 44 as normal commands.

All that remains is to eliminate a normal command which would perform the preselected function, e.g., writing, at the preselected address, e.g., LBN=531,312. This can be accomplished by embedding a key in the data area 26. Preferably, the key occurs at the beginning of the data area 26, so that the entire data area 26 does not have to be available to the program identifying existence of a command in the data area 26. The size of the key is indicated in FIGS. 2 and 3 as M bytes. The number of bytes required will depend upon the probability of a normal command passing tests. 40 and 42 and the desired probability of a false positive identification.

The key can be generated from a random number with or without repetition. If a pattern is repeated, the pattern may be varied in a defined manner to minimize the amount of storage required for the key. In addition, algorithms like those used for generation of check sums, cyclic-redundancy-check polynomials or error correction codes may be used.

The embodiment illustrated in FIG. 3 uses a single key pattern. The element number is initialized 46 and corresponding elements of the data area 26 and key string are compared 48. As soon as a mismatch occurs, the command area 24 is processed 44 as a normal command. If there is a match, the byte number is incremented 50 and compared 52 with the number of bytes (M) in the key. When all of the bytes in the key are found in sequence in the data area 26, the command located in the following bytes (M+1 to N) of the data area 26 is processed 54 as a special command.

The second set of commands may use any format, since they are not limited to the format of the first set of commands. For example, the Small Computer System Interface (SCSI) which is a standard of the American National Standards Institute (ANSI X3.131-1986) is a very flexible standard which allows commands to be machine specific. Therefore, in the preferred embodiment the SCSI standard is used for the second set of commands. An example of a command which can be transmitted as an SCSI command is a command to access a bad block table on a disk, so that the application software 12 can evaluate the quality of data storage on the disk.

Even if the operating system 14 permits the use of SCSI commands, there are two reasons for issuing commands to the peripheral equipment 20 using a method according to the present invention. First, the driver software 16 or other operating system modules 18 may not be able to generate or transfer all SCSI commands. Second, the present invention allows a single standard technique to be used on a variety of equipment, some of which may support the use of a desired SCSI command and others which do not.

Figure 1:
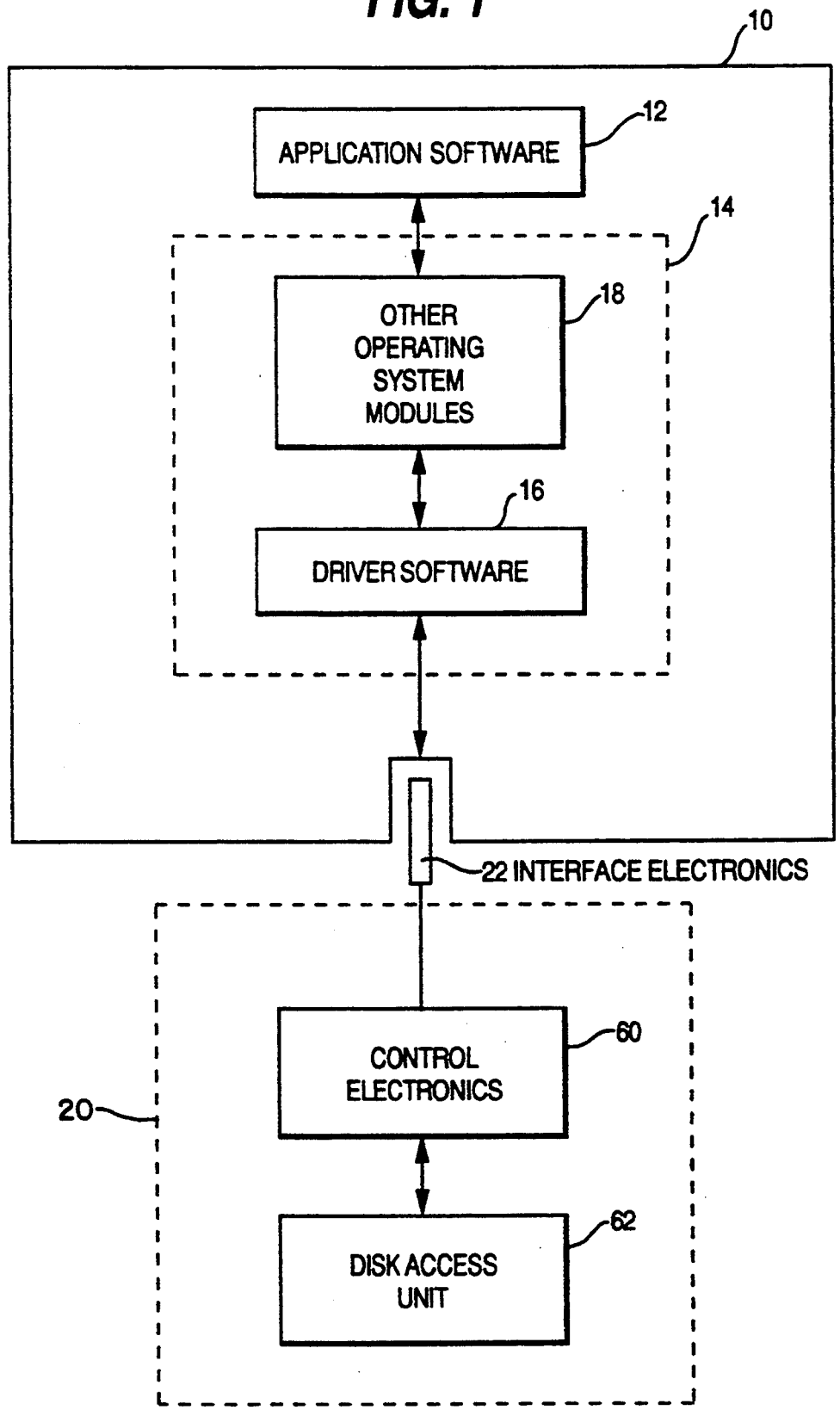
FIG. 1 is a block diagram of a computer system according to the present invention.

For example, some computer manufacturers, such as Digital Equipment Corporation (DEC), provide all driver software 16 (FIG. 1) for their products, such as VAX minicomputers and MicroVAX computers. Thus, the commands have to be passed from the application software 12 to at least the interface electronics 22 which executes firmware to perform a plurality of functions that may include identifying the existence of the command identification codes. On the other hand, IBM allows peripheral manufacturers to supply driver software 16 which interacts with other operating system modules 18 and peripheral equipment 20. As a result, the receiving program can be the driver software 16 which allows the interface electronics 22 to be more simply constructed. Another example is a Sun workstation which is similar to VAX computers in that the entire operating system 14 is provided by Sun, but no interface electronics 22 are required for many types of devices because a SCSI interface is provided. As a result, the receiving program is executed by control electronics 60 in the peripheral equipment 20.

In all three of the above examples, the present invention uses the application software 12 executed by the processor 10 as command generation means for storing command identification codes and one of the second set of commands in the data area 26 of one of the instructions, where the first set of commands are those defined by the computer system manufacturer (IBM, DEC or Sun) and the second set of commands are additional commands outside the first set. Also, all three examples include command identification means for identifying existence of the command identification codes in the data area of the one of the instructions and command execution means for executing the one of the second set of commands when the command identification codes are identified by the command identification means.

When the present invention is used to send commands to peripheral equipment 20 used for accessing rotary disk storage media, the command execution means includes a disk access unit 62 which accesses the rotary disk storage media stored thereon using magnetic, opto/magnetic or optical means. In the case of computer systems, e.g., VAX systems, in which the driver software 16 is supplied by the manufacturer that supplies the processor 10 and the peripheral equipment 20 is accessed by interface electronics 22, the command identification means can be provided by the interface electronics 22, and the command execution means would then also include the control electronics 60. In the case of computer systems, e.g., IBM PC systems, in which the driver software 16 is provided by the peripheral equipment manufacturer, the command identification means would be provided by the processor 10 executing the driver software 16 and the command execution means would include all of the peripheral equipment 20. In the third example, e.g., Sun systems, the command identification means would be provided by the control electronics 60, while the command execution means would be provided by the disk access unit 62.

The present invention can also be used to transmit commands to the unit which identifies existence of a command in the data area 26. For example, in the case of computer systems, e.g., VAX systems, which use the interface electronics 22 as command identification means, execution of the firmware controlling the interface electronics 22 could be modified by one of the second set of commands. One such command would be switching the error reporting mode on and off. Similarly, driver software 16 in IBM PC systems could be modified by one of the second set of commands.

Many of the features and advantages of the present invention are apparent from the detailed specification, and thus, it is intended by the appended claims to cover all such features and advantages which fall within the spirit and scope of the invention. Further, since numerous modifications and changes will readily occur to those skilled in the art, from the disclosure of the invention, it is not desired to limit the invention to the exact construction and operation illustrated and described. Accordingly, suitable modification and equivalents may be resorted to, all falling within the scope and spirit of the invention.

What is claimed is:

1. A method of processing instructions in a data processing apparatus, each instruction having a command area including an address area, and a data area, the instructions including first and second sets of commands, the first set of commands identified by codes in the command area, said method comprising the steps of:
   (a) detecting one of the second set of commands in the data area of one of the instructions without reference to the command area of the instruction;
   (b) identifying and executing the one of the second set of commands, detected in step (a), in the data processing apparatus without the codes in the command area having any effect on said executing; and
   (c) executing one of the first set of commands as identified by the command area when an instruction is received and step (a) does not detect any of the second set of commands.

2. A method as recited in claim 1, further comprising the step of (c) receiving each of the instructions in a substantially continuous stream of codes where any pauses in the stream are insignificant.

3. A method as recited in claim 1, wherein the first set of commands is fixed at a point in time prior to determining the second set of commands, and
   wherein said identifying in step (b) comprises the step of comparing a predefined portion of the data area with a list of commands included in the second set of commands.

4. A method of processing instructions in a data processing apparatus, each instruction having a command area including an address area, and a data area, the instructions including first and second sets of commands, the first set of commands identified by codes in the command area, said method comprising the steps of:
   (a) identifying one of the second set of commands in the data area of one of the instructions, said identifying including the step of (a1) detecting a predetermined series of codes in the data area indicating that one of the second set of commands is included elsewhere in the data area of the one of the instructions;
   (b) executing, in the data processing apparatus, the one of the second set of commands identified in step (a); and
   (c) executing one of the first set of commands identified by the command area when the predetermined series of codes is not detected in step (a1).

5. A method as recited in claim 4, wherein said identifying in step (a) further comprises the step of (a2) detecting a predetermined command, included in the first set of commands, in the command area of the one of the instructions.

6. A method as recited in claim 5, wherein said identifying in step (a) further comprises the step of (a3) detecting a predetermined address in the address area included in the one of the instructions.

7. A method as recited in claim 4, wherein said executing in step (b) comprises the steps of:
   (b1) reading a specific series of codes representing the one of the second set of commands from the data area following the predetermined series of codes indicating that any one of the second set of commands is included in the data area of the one of the instructions; and
   (b2) executing the one of the second set of commands read in step (b1).

8. A method as recited in claim 4, wherein the predetermined series of codes is detected in a first portion of the data area and the one of the second set of commands is identified in a second portion of the data area.

9. A system for transmitting instructions, having a command area including an address area, and a data area, from an originating program to a receiving program, the instructions including first and second sets of commands, the first set of commands identified by codes in the command area, said system comprising:

command generation means for storing command identification codes and one of the second set of commands in the data area of one of the instructions;

command identification means for determining existence of the command identification codes in the data area of the one of the instructions; and command execution means for executing the one of the second set of commands when the command identification codes are determined by said command identification means to exist in the data area in the one of the instructions and for executing one of the first set of commands in the command area when the command identification codes are not determined to exist in the data area of the one of the instructions.

10. A system as recited in claim 9,
wherein said command generation means comprises a processor executing command generation software and operating system software including driver software, the command generation software transmitting instructions containing the command identification codes to said command identification means via the operating system software including the driver software, wherein said command identification means comprises an interface electronics board, operatively connected to said processor, executing firmware having a plurality of functions, including determination of the existence of the command identification codes in the data area of the instructions, and wherein said command execution means comprises peripheral equipment including control electronics operatively connected to said interface electronics board.

11. A system as recited in claim 10, wherein said interface electronics board and said peripheral equipment use the Small Computer System Interface standard, the second set of commands are Small Computer System Interface commands and the operating system software and driver software are unable to handle all Small Computer System Interface commands.

12. A system as recited in claim 10, wherein said peripheral equipment accesses rotary disk storage media.

13. A system as recited in claim 9,
wherein said command generation means comprises a processor executing command generation software, wherein said command identification means comprises the processor executing driver software receiving instructions generated by the command generation software via operating system software executed by the processor, and wherein said command execution means comprises a peripheral system operatively connected to the processor.

14. A system as recited in claim 10, wherein the driver software and said peripheral equipment communicate using the Small Computer System Interface standard.

15. A system as recited in claim 14, wherein said peripheral system accesses rotary disk storage media.

16. A system as recited in claim 9,
wherein said command generation means comprises a processor executing command generation software and operating system software including driver software, the command generation software transmitting instructions containing the command identification codes to said command identification means via the operating system software including the driver software, wherein said command identification means comprises control electronics in peripheral equipment operatively connected to said processor, and wherein said command execution means comprises storage access means in the peripheral equipment for accessing data in dependence upon the one of the second set of commands identified by said control electronics.

17. A system as recited in claim 16, wherein the second set of commands are Small Computer System Interface commands and the first set of commands are not.

18. A system as recited in claim 16, wherein said storage access means accesses rotary disk storage media.

19. A method for executing instructions transmitted from an originating program to a receiving program executed by a data processing apparatus, the instructions having a command area including an address area, and a data area and including first and second sets of commands, the first set of commands identified by codes in the command area, said method comprising the steps of:

(a) storing, using a memory device operatively connected to the data processing apparatus, command identification codes and one of the second set of commands in the data area of one of the instructions;

(b) detecting existence of the command identification codes in the data area of the one of the instructions, using the data processing apparatus;

(c) executing, in the data processing apparatus, the one of the second set of commands when the command identification codes are detected in step (b); and (d) executing one of the first set of commands as identified by the command area when existence of the command identification codes in the data area of the instruction is not detected in step (b).

20. A method as recited in claim 19, wherein the receiving program accesses data on storage media with a first probability of error, wherein said detecting in step (b) is performed with a second probability of falsely identifying existence of the command identification codes when one of the second set of commands is missing from the data area of the one of the instructions, and wherein said storing in step (a) stores a number of the command identification codes sufficient to maintain the second probability not significantly greater than the first probability.

* * * * *